INVENTOR.
Boris M. Osojnak
BY
Harness and Harris
ATTORNEYS.

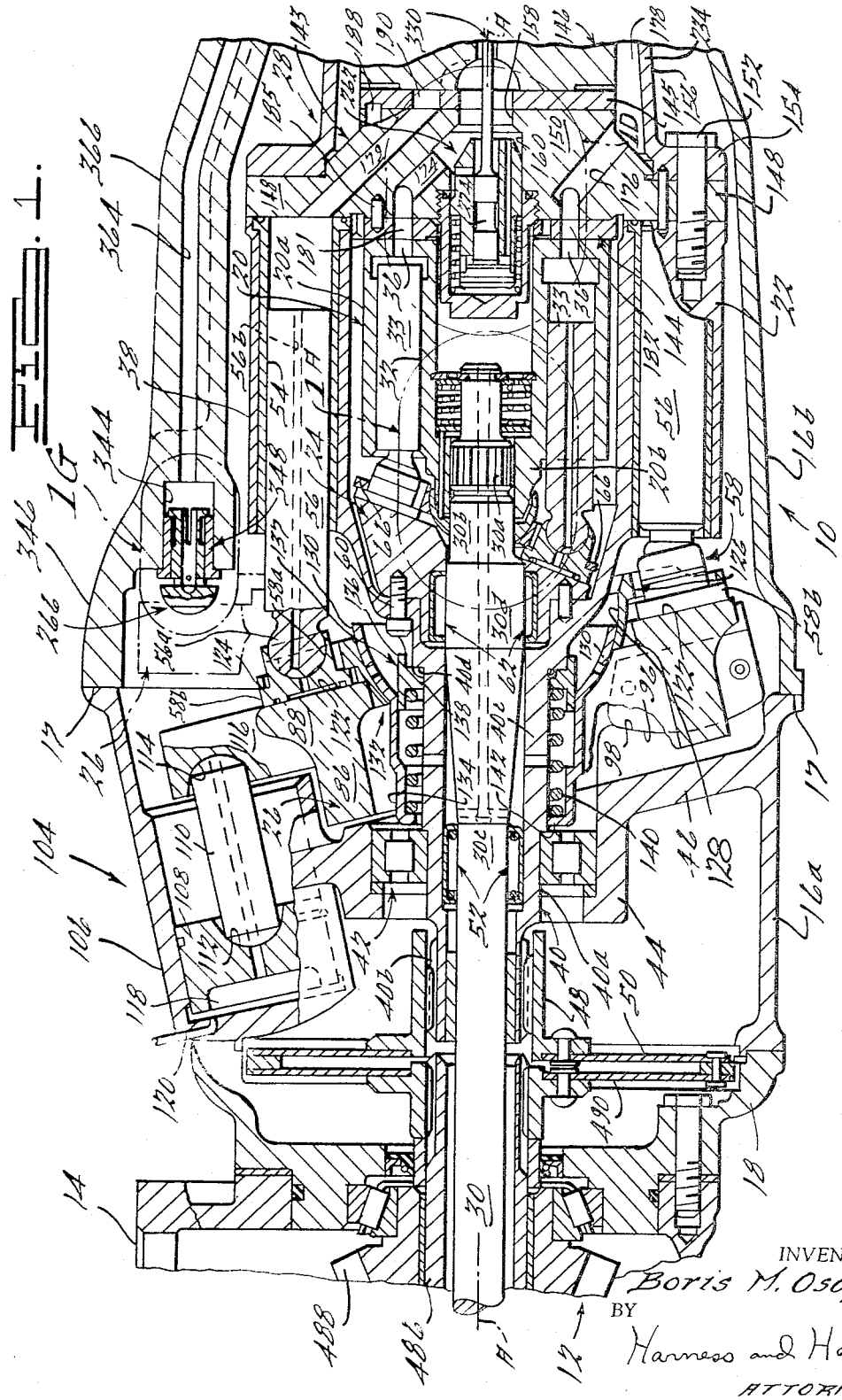

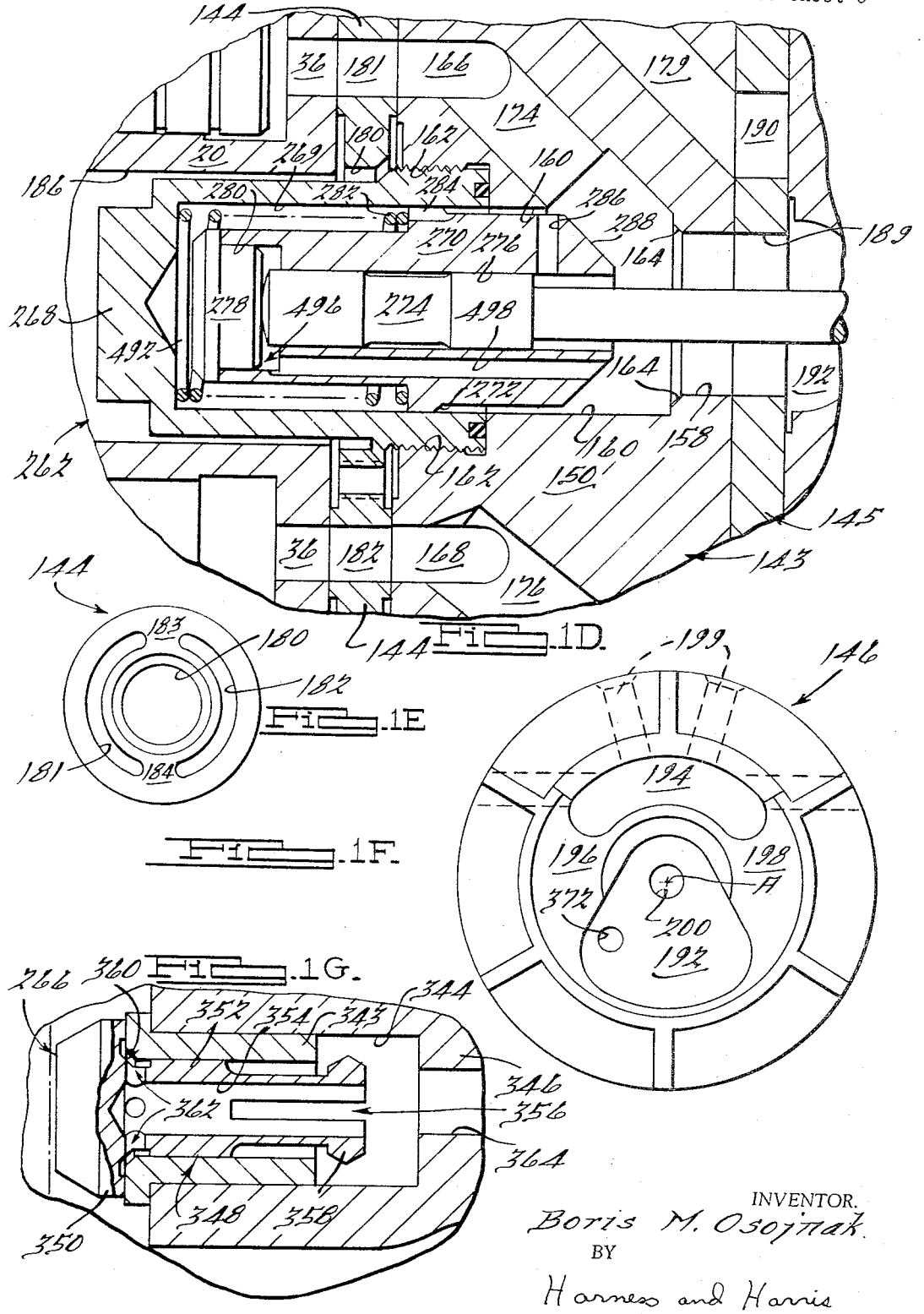

United States Patent Office 3,364,680
Patented Jan. 23, 1968

3,364,680
HYDROSTATIC TRANSMISSION
Boris M. Osojnak, Birmingham, Mich., assignor to Chrysler Corporation, Highland Park, Mich., a corporation of Delaware
Filed Dec. 13, 1965, Ser. No. 513,335
4 Claims. (Cl. 60—53)

ABSTRACT OF THE DISCLOSURE

A hydrostatic transmission of the split reaction type in which the motor swash plate is pivoted about an axis which is generally tangent to the imaginary circle passing through the longitudinal axes of the bores of the motor barrel so as to minimize the volume of trapped fluid behind the motor pistons with the motor swash plate in its locked-up, vertical position.

---

Figure 1A:
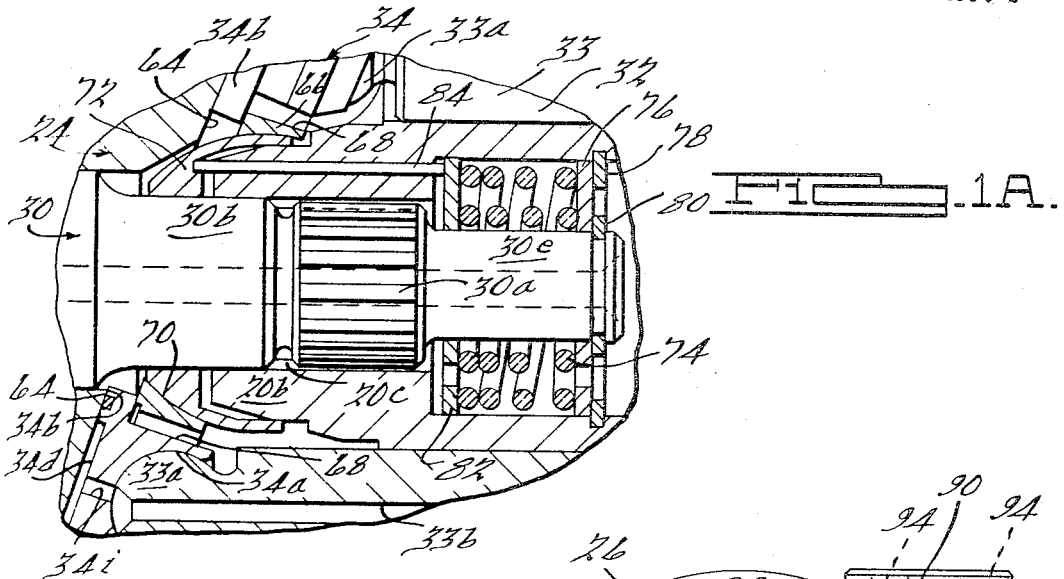

This invention relates to hydrostatic apparatus. More particularly, it relates to a hydrostatic transmission for a motor vehicle.

It is an object of the present invention to provide an improved transmission of the hydrostatic type.

A more specific object is to provide a hydrostatic transmission especially suitable for automotive use.

Another object is to provide a hydrostatic transmission of efficient and simple design.

Yet another object is to provide a hydrostatic transmission which is quieter and more efficient than previous designs and which is accordingly better suited for automotive use.

In a typical hydrostatic transmission for automotive use, the automobile engine drives an input shaft which in turn drives a positive displacement pump; the pressure fluid output of the pump is used to drive a positive displacement motor which in turn drives the wheels of the automobile.

The transmission of the invention is of the "split reaction" type. That is, of the type in which the motor includes a first member journalled within the transmission casing and coupled directly to the output shaft and a second member carried by the casing, and the pump includes a first member coupled directly to the input shaft and a second member carried by the first member of the motor. With this arrangement, the torque applied to the output shaft is a combination or summation of a direct or mechanical torque transmitted directly to the motor via the second pump part and an indirect or fluid torque generated by the pressurized fluid from the pump acting in the motor.

As is typical, the motor of the transmission of the invention is of variable displacement and the variation of the displacement is accomplished by movement of the second motor part relative to the first motor part between a torque-multiplying position in which the displacement of the motor is at a maximum and a locked-up or one-to-one position in which the displacement of the motor is essentially zero.

The present invention is particularly concerned with hydrostatic transmissions wherein the pump and motor are of the barrel and piston type.

Hydrostatic transmissions of this type in general comprise an input associated with a pump or "primary" barrel and a motor or "secondary" barrel associated with an output shaft. Each barrel typically has a plurality of circumferentially spaced bores slidably receiving a like plurality of pistons. The primary pistons are arranged to bear against a "primary" reaction member which presents a cam or eccentric face to the primary pistons so that the latter are stroked in response to relative rotation of the primary reaction member and the primary barrel. The secondary pistons are arranged to bear against a "secondary" reaction member which also presents a cam or eccentric face to the secondary pistons so that the secondary barrel and secondary reaction member are caused to undergo relative rotation in response to stroking of the secondary pistons. Valving means are provided to selectively direct the pressurized fluid output of the primary or pump barrel to the individual pistons of the secondary or motor barrel so that the secondary barrel undergoes rotation relative to the secondary reaction member in response to relative rotation of the primary barrel and primary reaction member.

In the transmission of the invention, the input and output shafts are coupled directly to the primary and secondary barrel, respectively, and the primary reaction member is fixedly carried on the secondary barrel for rotation therewith so that the torque applied to the secondary barrel, and thereby to the output shaft, is "split." That is, it is a combination or summation of a direct or mechanical torque generated by the direct reaction of the primary pistons against the primary reaction member and an indirect or fluid torque generated by the pressurized fluid from the primary barrel acting in the secondary cylinder bores to drive the secondary pistons against the secondary reaction member.

The secondary barrel of the transmission of the invention is cylindrical and the secondary pistons are slidably received in circumferentially spaced bores extending axially in the cylindrical barrel. The secondary reaction member of the transmission of the invention comprises a swash plate which is mounted for pivotal movement between an inclined or torque multiplying position in which the camming or eccentricity of the working face of the swash plate against which the secondary pistons bear is at a maximum, whereby the working stroke of the primary pistons is at a maximum, and a locked-up or one-to-one position in which the working face of the swash plate is perpendicular to the central barrel axis so that the secondary pistons remain substantially fixed relative to their bores as the secondary barrel rotates relative to the swash plate.

According to an important feature of the invention, the pivotal axis of the swash plate is generally tangent to the imaginary circle passing through the longitudinal axes of the secondary bores. This mounting of the swash plate eliminates any axially inward movement of any secondary pistons as the swash plate is moved from its perpendicular or locked-up position to its inclined or torque multiplying position; accordingly, the secondary pistons may be arranged so that they are substantially at the blind end of their respective bores with the swash plate in locked-up position, thereby minimizing the volume of the fluid trapped behind the pistons during operation of the transmission in drive or one-to-one condition. As will hereinafter be described in more detail, reducing the volume of this trapped fluid has the desirable effect of reducing the hammering noises and vibrations that have plagued previous hydrostatic transmissions of the split reaction type. It also has the effect of increasing the efficiency of the transmission by reducing the leakage or compressible flow between the pump and the motor.

Figure 1B:
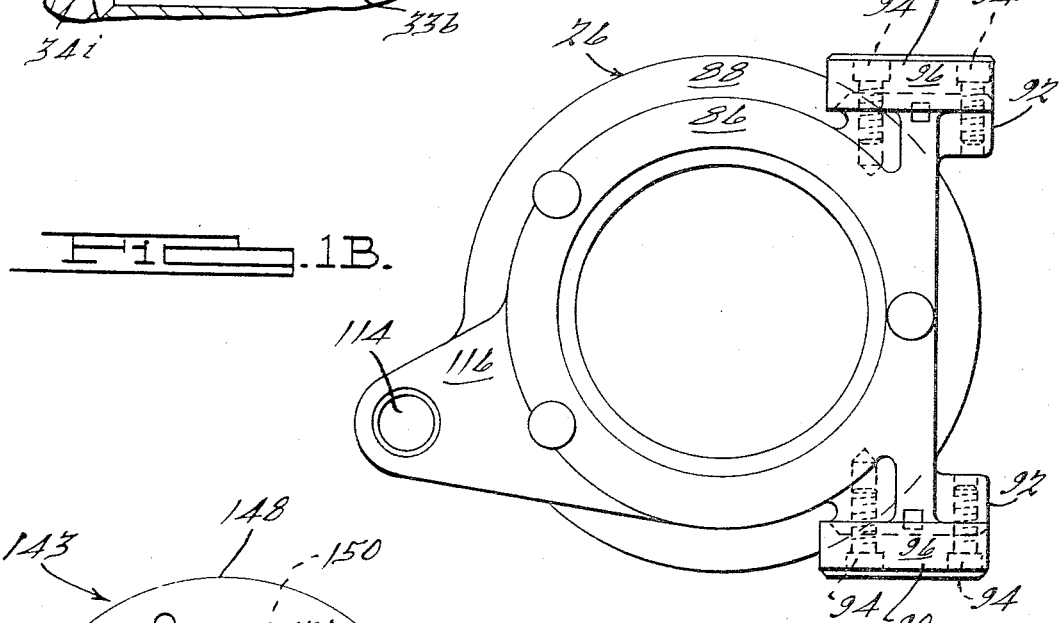
Figure 1C:
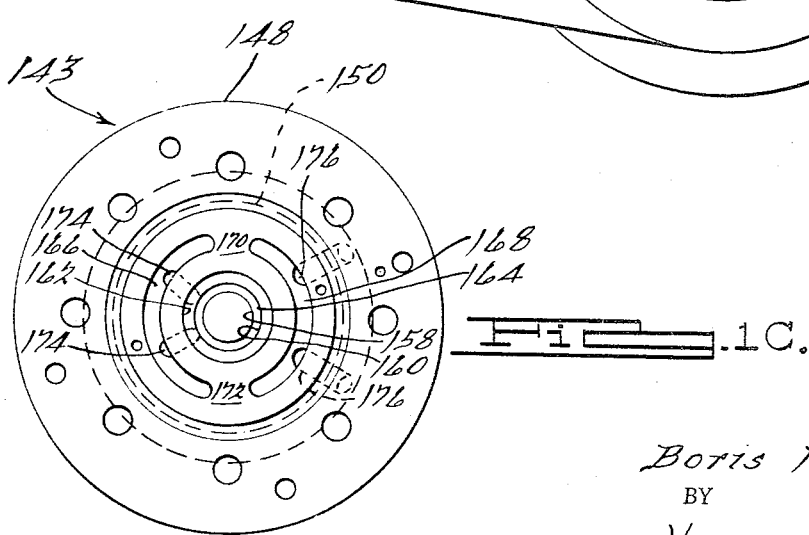

These and other objects, features and advantages of the invention will be apparent from the following detailed description of a preferred embodiment of the invention, and from the accompanying drawings wherein:

FIG. 1 is a fragmentary top view, in cross-section, of a transaxle unit embodying a hydrostatic transmission according to the invention; and FIGS. 1A-1G are detail views of various parts of the unit to FIG. 1.

General description

The description to follow is made with continual reference to FIG. 1 and with specific reference, where indicated, to other detail figures. Unless otherwise indicated, the terms left and right as hereafter used refer to the orientation of FIG. 1.

The hydrostatic transmission of the invention is shown in FIG. 1 as part of a transaxle unit consisting of the hydrostatic transmission, seen generally at 10, and a differential, seen fragmentarily at 12.

Differential 12 includes a differential housing 14 and transmission 10 includes a transmission housing having a left portion 16a and a right portion 16b butted together at 17. Housing 14 is coupled to left housing portion 16a by an adapter plate 18.

Transmission 10, broadly considered, comprises a primary barrel 20, a secondary barrel 22, a primary reaction member 24, a secondary reaction member 26, and valving means, seen generally at 28, for establishing selective fluid communication between primary barrel 20 and secondary barrel 22.

Detailed description

Primary barrel 20 includes a main body portion 20a, in the form of a cylindrical shell, and a hub portion 20b. Particular reference is now made to FIG. 1A, which is an enlarged view of the structure within oval 1A of FIG. 1. Hub portion 20b is provided with internal splines 20c which coact with an externally splined portion 30a of an input drive shaft 30. Barrel 20 is thus fixed to shaft 30 for rotation therewith. Shaft 30 also includes a pilot portion 30b which seats snugly within the left-hand unsplined portion of hub portion 20b and butts against the left ends of splines 20c.

The main body portion 20a of the barrel 20 defines a plurality of circumferentially spaced, axially extending blind bores 32. A primary piston 33 is slidably received in each bore 32. Each primary piston 33 includes a ball end 33a swively received in a spherical socket 34a provided by a primary piston shoe 34.

Secondary barrel 22 includes a main body portion 38, in the form of a cylindrical shell, and an elongated hub portion 40.

Secondary barrel 22 is rotatably mounted in transmission housing 16a, 16b for rotation about a central longitudinal axis A, by a roller bearing 42. Bearing 42 has its inner race press fitted on a journal section 40a of hub portion 40 and its outer race received in a central hub portion 44 of an integral partition 46 extending transversely of housing portion 16a. The free end section 40b of hub portion 40 is externally splined to key into the internally splined hub 48 of a flex plate 50.

Input shaft 30 passes coaxially through hub portion 40 of secondary barrel 22 and primary barrel 20 is disposed concentrically within the hollow main body portion 38 of secondary barrel 22. A needle bearing 52 within hub portion 40 rollably engages a journal portion 30c of shaft 30 to journal shaft 30 for rotation relative to secondary barrel 22 about central axis A.

A plurality of secondary bores 54 extend axially through main body portion 38 at circumferentially spaced locations therearound. A secondary piston 56 is slidably received in each bore 54. Each secondary piston includes a ball end 56a swivelling received in a sperical socket 58a provided by a secondary piston shoe 58.

Primary reaction member 24 is in the form of a swash plate and is positioned within main body portion 38 of the secondary barrel coaxial with shaft 30. Screws 60 passing through secondary barrel hub portion 40 fix member 24 against rotation relative to the secondary barrel. Member 24 has a central bore to pass shaft 30 and carries a needle bearing 62 which rollably engages a journal portion 30d of shaft 30 to assist bearing 52 in journaling shaft 30 in the secondary barrel. Member 24 presents a flat annular bearing surface 64 which is inclined relative to the axis of shaft 30 and extends around that axis to successively intersect the longitudinal axes of the successive primary bores 32.

A primary pressure plate 66 is provided to continuously urge piston shoes 34 against annular bearing surface 64. Plate 66 is generally annular in form and includes a plurality of circumferentially spaced holes 68. Each hole 68 is of a diameter somewhat greater than that of the socket portion of a primary shoe 34 and somewhat less than that of the base portion of a primary shoe.

As best seen in FIG. 1A, the radially inner surface 70 of plate 66 is spherical and mounts plate 66 for swivelling movement on a ball joint member 72 carried on pilot portion 30b of input shaft 30. Ball joint member 72 is fixed against rotation on shaft portion 30b but is free to slide axially along that shaft portion. Ball joint member 72 is generally cup shaped and fits snugly over the free end of hub portion 20b of the primary barrel.

A double coil spring 74 is carried on the free or stub end portion 30e of the input shaft. Spring 74 bears at one end against a plate or disc 76 mounted on stud end shaft portion 30e. Disc 76 is held against axial movement toward the free end of shaft portion 30e by a snap ring 78 received in an internal groove in primary barrel 20. Another snap ring 80, provided for assembly purposes, is fitted into an external groove in stub end shaft portion 30e.

Spring 74 bears at its other end against a plate or disc 82 slidably mounted on stud end shaft portion 30e. Disc 82 in turn bears against one or more pins 84 which extend axially and slidably through the hub portion 20b of primary barrel 20 and are received at their other ends in sockets provided in the hub portion of ball joint member 72. Spring 74 thus acts to continuously urge ball joint member 72 axially along shaft portion 30b and ball joint member 72 in turn continuously presses pressure plate 66 against the base portions 34b of the several primary piston shoes 34 to maintain the bearing faces of the later in firm, flush contact with the annular bearing surface 64 presented by the primary reaction member 24.

Secondary reaction member 26 is in the form of a swash plate. Member 26 is best seen in FIG. 1B, which is a view of the left face of that member. Member 26 is generally annular and includes a base portion 86 and a flange portion 88 integral with base portion 86. Member 26 is mounted within housing 16a, in a position encircling hub 40 of secondary barrel 22, by a pair of bearing shoes 90 secured to lugs 92 as by screws 94. Lugs 92 are formed integral with the base and flange portions of reaction member 26. Shoes 90 present circular arcuate bearing surfaces 96 which coact with vertically spaced arcuate bearing surfaces 98 (only the lower or bottom one of which is seen in FIG. 1) provided by partition 46 to mount member 26 for pivotal movement about a vertical axis passing through the center of the circular arcs 96, 98. This pivotal axis of member 26 is substantially tangential to the imaginary circle passing through the longitudinal axes of the secondary bores 54.

Member 26 is pivotally movable between the illustrated inclined or canted position and a position, seen in fragmentary phantom in FIG. 1, normal to axis A. This movement is accomplished by a cylinder and piston unit seen generally at 104. Unit 104 includes a cylinder 106 formed integral with housing portion 16a, a piston 108 slidable within cylinder 106, and a piston rod 110 received at one end in a socket 112 in piston 108 and at its other end in a socket 114 provided by a radial arm 116 formed integral with member 26. Upon admission of fluid under pressure to the sealed chamber 118 of cylinder 106, as for example through a passage 120 in cylinder 106, member 26 will be pivoted about its axis and moved gradually toward its phantom or normal position.

Flange portion 88 of reaction member 26 presents a flat annular bearing surface 122 which extends around axis A to successively intersect the longitudinal axes of the successive secondary bores 54. A secondary pressure plate 124 is provided to continuously urge secondary piston shoes 58 against annular bearing surface 122.

Plate 124 is generally annular in form and includes a plurality of circumferentially spaced holes 126. Each hole 126 is of a diameter somewhat greater than that of the socket portion 58a of a secondary shoe 58 and somewhat less than that of the base portion 58b of a secondary shoe. The radially inner surface 128 of plate 124 is spherical and mounts plate 124 for swivelling movement on the spherical bearing portion 130 of a ball joint member 132. Member 132 also includes a hub portion 134 slidably received over a cylindrical shell portion 136 of a spring adapter member 137. Member 137 also includes a central interior flange portion 138. Member 137 is fitted over section 40c of hub portion 40 to abut central flange portion 138 against an annular shoulder 40d at the right end of hub section 40c.

A compression spring 140 is carried on section 40c. Spring 140 bears at one end against central flange portion 138 and at its other end against a radial lip 142 formed as the inturned free end of hub portion 134 of ball joint member 132. Spring 140 thus acts to continuously urge ball joint member 132 axially along hub section 40c and ball joint member 132 in turn continuously presses pressure plate 124 against the base portions 58b of the several secondary shoes 58 to maintain the bearing faces of the latter in firm, flush contact with the annular bearing surface 122 presented by the secondary reaction member 26.

Valving means 28 includes an unpressurizing housing 143, a primary port plate 144, a wear plate 145, and a secondary port plate 146.

Unpressurizing housing 143 is best seen in FIG. 1C, which is a view of the left face of that housing. Housing 143 includes a circular flange portion 148 and a central or hub portion 150. Flange portion 148 has an outside diameter equal to that of the main body portion 38 of secondary barrel 22. Housing 143 is secured to secondary barrel 22 by bolts 152 which pass through bores in the flange portion 154 of an inner housing 156 and through aligned bores in flange portion 148 for threaded engagement with secondary barrel 22. Unpressurizing housing 143 is thus clamped fixedly between secondary barrel 22 and inner housing 156.

As best seen in FIG. 1D, which is an enlarged view of the structure within the oval 1D of FIG. 1, hub portion 150 of unpressurizing housing 143 has a central bore 158, a counterbore 160, and a further threaded counterbore 162. The shoulder between bore 158 and counterbore 160 is chamfered to provide a conical valve seat 164.

Referring again to FIG. 1C, hub portion 150 further includes a pair of kidneys or slots 166, 168 laid out on concentric circles centered on axis A and having a mean radius equal to the radius of the circle passing through the longitudinal axes of primary bores 32. Slots or kidneys 166, 168 are of equal effective length and are separated by diametrically opposed land portions 170, 172 each having a circumferential extent approximately equal to the diameter of a cylinder port 36. A plurality of diagonal bores 174 connect kidney 166 with counterbore 160 and a plurality of diagonal bores 176 connect kidney 168 with an annular space 178 defined between the outer peripheral surface of hub portion 150 and the adjacent inner peripheral surface of inner housing 156. A bore 179 extends from each secondary bore 54 and passes diagonally through hub portion 150 to open at the right-hand face of the latter. Bores 179 are spaced circumferentially around central bore 158.

Primary port plate 144 is best seen in FIG. 1E, which is an enlarged view of the left face of that plate. Plate 144 is disc-shaped and includes a central bore 180 and a pair of kidneys or slots 181, 182 separated by diametrically opposed land portions 183, 184. Plate 144 is fixedly secured, as by pins 185, to the left face of unpressurizing housing 143. When thus affixed, slots 181, 182 line up with and are circumferentially coextensive with slots 166, 168 and central bore 180 lines up radially with threaded counterbore 162 and the inner peripheral surface 186 of primary barrel 20 to form therewith a generally continuous central bore. Spring 74 acts through disc 76 and snap ring 78 to continuously press the right annular face of primary barrel 20 against the left face of primary port plate 144.

Wear plate 145 is disc shaped and is fixedly secured to the right face of unpressurizing housing 143 by pins 188. Plate 145 has a central bore 189 and a plurality of axial bores 190, corresponding in number to bore 179 in housing 143, which line up with the respective bores 179 to form axial extensions thereof.

Secondary port plate 146 is generally disc shaped. Wear plate 145 and port plate 146 are pressed together in firm face to face relation by spring 140 acting through adapter member 137. Plate 146 is not secured to wear plate 145, so as to allow relative rotation therebetween. The left face of plate 146 is seen in FIG. 1F. Port plate 146 includes a high pressure cavity 192 and a low pressure cavity 194, each opening at the left face of the plate. High pressure cavity 192 is of generally triangular configuration and includes central axis A. Low pressure cavity 194 comprises an arcuate slot or kidney curving around the radially inner apex of cavity 192. The radially outer edge of cavity 192 and the radially outer edge of cavity 194 are laid out on a circle centered on axis A, and having a radius approximately equal to that of an imaginary circle tangent to the outer edges of bores 190 in wear plate 145. Land portions 196, 198 separate each end of slot 194 from the adjacent edge of high pressure cavity 192. A plurality of diagonal holes 199 connect kidney or slot 194 with annular space 178.

The hydrostatic transmission of the invention also includes means for selectively blocking fluid communication between primary barrel 20 and secondary barrel 22. These blocking means including a valve assembly 262, and a pressure control assembly 266.

Valve assembly 262 is best seen in FIG. 1D. Assembly 262 includes a cap member 268 threaded into counterbore 162 in unpressurizing housing 143 to align the bore 269 of the cap member with counterbore 160, a generally cylindrical valve body 270 received within aligned bores 269 and 160 and having a flange portion 272 slidably engaging the aligned bores to mount valve body 270 for reciprocal movement therein, and a valve spool 274 slidably received within a bore 276 extending axially through valve body 270. The free or lefthand end of spool 274 is spherical and bears against a plug 278 press fitted into a counterbore 280 in the left face of valve body 270 and a piston rod 330 extends integrally from the right end of spool 274. A coil spring 282 is fitted over the portion of valve body 270 to the left of flange portion 272 and is compressed between the blind end of bore 269 and the annular shoulder provided by the left face of flange portion 272. Axially extending notches 284 are provided at circumferentially spaced locations in flange portion 272 and a bore 286 extends radially through the portion of the valve body to the right of flange portion 272. Bore 286 opens in central bore 276 at a location which, in the position of FIG. 1, is immediately to the right of the right end of spool 274. The right face of valve body 270 is chamfered to provide a conical valve face 288 or sealing cooperation with conical valve seat 164 in a manner to be presently described.

Pressure control assembly 266 is best seen in FIG. 1 and in FIG. 1G which is an enlarged view of the structure within the oval 1G of FIG. 1. Assembly 266 includes a hollow sleeve 343 press fitted into a blind cylindrical bore 344 formed in a thickened portion 346 of transmission housing portion 16b, and an actuator or valve element in the form of a piston 348 slidably received in sleeve 343. Piston 348 includes a head portion 350 and a stem portion 352. Stem portion 352 has a central blind bore 354 and a plurality of axially extending slots 356. Slots 356 define a plurality of spring fingers 358 which yield radially inwardly to allow insertion of piston 348 into sleeve 343 and then snap out when clear of sleeve 343 to prevent removal of the piston from the sleeve. Head portion 350 is undercut to provide an annular groove 360 which extends axially into stem portion 352 where it communicates with central bore 354 through a plurality of radial passages 362. A passage or bore 364, provided in a rib 366 extending axially along the outer surface of housing portion 16b, opens at one end in bore 344.

Operation

Upon rotation of input shaft 30, primary barrel 20 is rotated. As barrel 20 rotates, primary pistons 33 are reciprocated in their respective bores through alternate intake and compression strokes. Each such stroke is of a fixed length determined by the angle of annular bearing surface 64 on primary swash plate 24.

As each primary piston moves through a suction or intake stroke, the cylinder port 36 of the primary bore slidably receiving that piston moves along and in communication with low pressure kidney 182 in primary port plate 144 and low pressure kidney 168 in unpressurizing housing 143, whereby fluid is drawn from space 178, through bores 176, and through aligned kidneys 168 and 182 to fill the primary bore behind the retreating piston. As the piston reaches the end of its suction or intake stroke (this position is illustrated by the "lower" primary piston in FIG. 1), its cylinder port moves off of kidney 182 and onto land 184, whereby to trap the fluid which has filled in behind the piston. As the piston thereafter begins its working or compression stroke, its cylinder port moves into communication with the aligned high pressure kidneys 181 and 166 in primary port plate 144 and unpressurizing housing 143. The pressurized fluid is thus pushed out of the primary bore, through aligned kidneys 181 and 166 and through diagonal bores 174 and aligned central bores 158, 189 to high pressure cavity 192 in secondary port plate 146. The cylinder port remains in communication with kidneys 181 and 166 for the duration of the working stroke of the related piston, whereafter it moves onto land 183 and thereafter into communication with aligned low pressure kidneys 182 and 168 as the piston again begins an intake or suction stroke.

Rotation of primary barrel 20 thus results in the continuous delivery of pressurized fluid to high pressure cavity 192. From high pressure cavity 192, the pressurized fluid passes into the several bores 190 that are at any given instant in communication with cavity 192. From bores 190 the fluid passes through the corresponding diagonal bores 179 and into the corresponding secondary bores 54 where it exerts a working pressure against the corresponding secondary pistons 56. These pistons are thereby pushed outwardly and slide along the inclined face 122 of secondary swash plate 26 to produce rotation of the secondary barrel assembly and thereby rotate output shaft 486 and output pinion 488 through flex plates 50 and 490.

As each secondary piston reaches the end of its working or driving stroke, the corresponding bore 179 moves out of communication with cavity 192 and onto land 196 to trap the fluid in the piston. As the piston thereafter begins its exhaust stroke, the corresponding bore 179 moves into communication with low pressure cavity or kidney 194 in secondary port plate 146. The fluid is thus pushed out of the secondary bore and dumped into cavity 194 from where it moves through bores 199 into annular space 178 where it may again be sucked into a primary bore for recirculation in the described closed loop. Bore 179 remains in communication with kidney 194 for the duration of the exhaust stroke of the related piston, whereafter it moves onto land 198 and thereafter into communication with high pressure cavity 192 where it again receives pressurized fluid to move the piston through another driving or working stroke.

It will be noted that with each pumping stroke of a primary piston, a reaction force is transmitted back through that piston and applied against primary swash plate 24. This reaction force is absorbed by the primary swash plate and generates a torque tending to rotate the primary swash plate, and thereby the secondary barrel assembly, in the same direction as the primary barrel. The secondary barrel assembly, and thereby the output shaft, are thus rotated by the combination of the torque generated by the direct or mechanical reaction of the primary pistons against the primary swash plate and the torque generated by the indirect action of the pressurized fluid acting in and driving the secondary pistons. The hydrostatic transmission of the invention is thus of the "split torque" or "split reaction" type.

When starting up, the secondary swash plate will normally be at its maximum inclination, thereby requiring a maximum volume of pressurized fluid to move each secondary piston through each stroke and thereby giving a maximum mechanical advantage or torque multiplication.

As the speed of the input shaft increases, the secondary swash plate is moved gradually toward its right angle position with respect to the transmission axis. As the inclination of the secondary swash plate decreases, the stroke of the secondary pistons decreases, thereby requiring a progressively smaller volume of fluid to move each secondary piston through each stroke and thereby progressively decreasing the torque multiplication.

The torque ratio of the transmission reaches one-to-one as the secondary swash plate reaches its right angle position with respect to the transmission axis. In this position, the secondary pistons have zero stroke and the primary and secondary barrels are hydraulically locked together and rotate as a unit. All of the torque is now being transmitted directly through the primary swash plate since the secondary pistons, because of their zero stroke, have zero torque output.

In this locked up, one-to-one condition, the bore 179 associated with each secondary bore 54 communicates alternately with low pressure cavity 194 and high pressure cavity 192 as the locked up primary and secondary barrels rotate as a unit relative to the stationary secondary port plate. The column of fluid trapped in each secondary bore behind the piston and in the associated diagonal bore 179 is thus subjected alternately to high and low pressures so that it is alternately, and in extremely rapid succession, being compressed and then allowed to expand. This "compressibility pumping" of the columns of trapped fluid in the secondary bores and associated diagonal bores 179 creates a loud and extremely objectionable hammering noise. This noise, together with the accompanying vibration, greatly reduces the attractiveness of hydrostatic transmissions of this type for automotive use. The alternative compression and expansion of the trapped column of fluid also results in a small but significant leakage or compressibility flow between the primary and secondary barrels. This flow is generally equal to the product of the volume by which each individual column expands with each cycle, the number of secondary bores in the secondary barrel, and the instantaneous angular speed of the barrel. This leakage or compressibility flow results in rotation or slippage of the primary swash plate relative to the primary barrel with a resulting significant loss in overall transmission efficiency.

In the transmission of the present invention, the previously described blocking means 262, 266 operate to substantially reduce this hammering noise and substantially eliminate this compressibility or leakage flow.

During operation of the transmission, fluid under nominal pressure is supplied continuously to bore 364. So long as secondary swash plate 26 remains in an inclined position, this fluid unseats piston or actuator 348 and allows fluid to continuously escape through radial bores 362 and annular groove 360. However, as secondary swash plate 26 reaches its upright or right angle position, it engages head portion 350 of piston or actuator 348 and seats that head portion firmly against sleeve 343, whereby to cut off escape of fluid through groove 360.

Fluid pressure thereafter immediately builds up in bore 364. A valve assembly (not shown herein but fully disclosed in applicant's copending U.S. patent application Serial No. 499,690, filed on Oct. 21, 1965) acts in response to the increased fluid pressure to move piston rod 330, and thereby valve spool 274, to the right. As spool 274 moves to the right, valve body 270 follows it under the urging of spring 282. Spring 282 is able to readily move valve body 270 to the right despite the high fluid pressure in bore 160 since the space 492 behind plug 278 is in fluid communication with bore 160 via notches 284 so that the fluid pressure force acting against conical valve face 288 is effectively counterbalanced by the fluid pressure force acting against the left face of plug 278. After a predetermined amount of rightward movement, conical valve face 288 seats against conical face 164 on unpressurizing housing 143.

At this instant, bore 160 is not yet blocked since there is still fluid pressure communication through radial bore 286 and axial bore 276. However, valve spool 234 continue to move to the right, sliding within valve body 270 to a position where it blocks radial bore 286 and thereby completely blocks bore 160.

Valve body 270 now completely blocks fluid communication between primary barrel 20 and secondary barrel 22. The fluid in high pressure cavity 192 now quickly drops to a nominal pressure substantially equal to that of the fluid in discharge kidney 194. The columns of fluid trapped in the secondary bores behind the pistons and in the associated diagonal bores thus undergo substantially no pressure change as they communicate alternately with "high pressure" cavity 192 and "low pressure" cavity 194. The "compressibility pumping" or "compressibility flow" that so seriously impaired the usefulness and practicality of previous hydrostatic transmissions of the split reaction type is thus largely eliminated in the transmission of the invention.

Isolating the secondary barrel and secondary port plate from the high pressures of the primary barrel also has the effect of reducing the force with which the secondary shoes are pressed against the secondary swash plate as well as the force with which unpressurizing housing 143 is pressed against the secondary port plate. The friction losses occurring between the rotating secondary shoes and the stationary secondary swash plate, and between the rotating unpressurizing housing and the stationary secondary port plate, are thus substantially reduced, thereby effecting a further improvement in the overall efficiency of the transmission in one-to-one ratio.

The pivotal mounting of the secondary swash plate on an axis generally tangent to the imaginary circle passing through the longitudinal axes of the secondary bores, rather than as previously on a pivotal axis passing through the central axis A of the transmission, also contributes to the quietness and smoothness of the transmission. That is, it was necessary with the prior, centrally pivoted swash plate to arrange the secondary pistons so that they would be substantially spaced from the blind end of the secondary bores with the secondary swash plate in vertical position so that the "bottom" pistons would have room to move further into their respective bores as the secondary swash plate was pivoted to its inclined, torque multiplying position. Since with the pivotal mounting of the present invention there is no axially inward movement of any secondary piston as the swash plate is moved from its vertical position to its inclined or torque multiplying position, the secondary pistons may be arranged so that they are substantially at the blind ends of their respective bores with the secondary swash plate in its vertical position.

The pivotal mounting of the invention thus substantially reduces the volume of dead or trapped fluid with the transmission in one-to-one or drive condition; this in turn reduces the amount of alternate compression and expansion that the trapped fluid undergoes and thereby further reduces the vibration, noise and slippage characteristic of prior transmissions of this type.

Valve body 270 is maintained firmly in its seated or blocking position by the pressure differential at its opposite ends. That is, since the fluid acting on its left end at plug 278 is at primary barrel pressure and the fluid acting at its right end on conical face 288 is at nominal secondary barrel pressure, there is a large net pressure force urging face 288 against face 164.

When the secondary swash plate moves away from its vertical position to again assume an inclined position, piston 348 is again unseated, whereupon the fluid pressure in bore 364 drops to its former nominal value to allow piston rod 330 to move to the left and thereby move valve spool 274 to the left within valve body 270 and uncover radial port 286. As soon as radial port 286 is uncovered, the pressure acting on the opposite ends of the valve body 270 is equalized so that a valve spool 274 thereafter bottoms against plug 278, the valve body is readily moved to its illustrated open position.

The positioning of secondary swash plate 26 is controlled by modulation of a pressure signal tapped from the high pressure side of the transmission.

The pressure signal sensed in the transmission is fed to a control system, not shown, where, for example, it is modulated with a first pressure signal proportioned to the speed of the engine and a second control signal proportional to accelerator depression; the resulting control signal is then supplied through port 120 to cylinder and piston unit 104 to selectively move piston 108 in cylinder 106 and selectively position the secondary swash plate.

Further details of the construction and operation of the hydrostatic transmission of the invention are disclosed in the above-identified copending U.S. patent application.

Although a preferred embodiment of the invention has been illustrated and described in detail, it will be understood that various changes and modifications may be made in the disclosed embodiment without departing from the scope or spirit of the invention as defined in the appended claims.

I claim:

1. In a hydrostatic transmission of the split reaction type including
   (A) an input shaft;
   (B) an output shaft;
   (C) a positive displacement motor including
      (1) a cylindrical barrel mounted for rotation about its central axis and having a plurality of axially extending and circumferentially spaced bores,
      (2) a swash plate mounted for pivotal movement about an axis perpendicular to said barrel axes between (a) a torque multiplying position in which its working face is at an acute angle to said barrel axis and (b) a locked-up position in which said face is perpendicular to said barrel axis and
      (3) a plurality of pistons slidably received within said bores and bearing at their free ends against said working face;
   (D) positive displacement pump means, including a first pump member fixed to said input shaft for rotation therewith and a second pump member carried by said cylindrical barrel for rotation therewith, and
   (E) valve means operative to receive the high pressure fluid output of said pump means and deliver it to the successive bores of said cylindrical barrel to force said pistons outwardly against said swash plate;
the improvement wherein:
   (F) the pivotal axis of said swash plate is generally tangent to the imaginary circle passing through the longitudinal axes of said bores.

2. A hydrostatic transmission according to claim 1
(A) wherein
  (1) said valve means includes (a) low pressure conduit means establishing fluid communication between the intake of said pump means and a source of low pressure fluid and (b) high pressure conduit means establishing fluid communication between the output of said pump means and said motor, and
(B) further including means operative in response to movement of said swash plate into its locked-up position to block said high pressure conduit means and thereby isolate the motor from the high pressures generated in said pump means.

3. A hydrostatic transmission according to claim 2 wherein said blocking means includes a actuator element positioned in the arcuate path of the free end of said swash plate so as to be engaged by said swash plate as it reaches its locked-up, perpendicular position.

4. A hydrostatic transmission according to claim 3 wherein
(A) said actuator element is mounted for movement in the direction of movement of the free end of said swash plate as the latter moves toward its locked-up position, whereby said actuator element is engaged by said swash plate free end as the plate moves toward its locked-up position and thereafter moves with said plate in said direction, and
(B) means are provided to limit the movement of said actuator element in said direction, whereby to define the locked-up, perpendicular position of said swash plate.

References Cited
UNITED STATES PATENTS

| | | | |
|---|---|---|---|
| 2,619,041 | 11/1952 | Born | 60—53 X |
| 2,777,286 | 1/1957 | Badalini | 60—53 |
| 3,107,490 | 10/1963 | Cooper et al. | 60—53 |

FOREIGN PATENTS

| | | |
|---|---|---|
| 980,838 | 1/1965 | Great Britain. |

EDGAR W. GEOGHEGAN, *Primary Examiner.*